(12) United States Patent
Nakai et al.

(10) Patent No.: US 10,208,649 B2
(45) Date of Patent: Feb. 19, 2019

(54) ESTIMATOR AND ESTIMATOR SYSTEM

(71) Applicant: TOYOTA JIDOSHA KABUSHIKI KAISHA, Toyota-shi, Aichi-ken (JP)

(72) Inventors: Hideo Nakai, Nagakute (JP); Hiroyuki Hattori, Okazaki (JP); Toshinori Okouchi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/631,287

(22) Filed: Jun. 23, 2017

(65) Prior Publication Data
US 2017/0370276 A1  Dec. 28, 2017

(30) Foreign Application Priority Data

Jun. 24, 2016 (JP) ................................ 2016-125848
Jun. 21, 2017 (JP) ................................ 2017-121007

(51) Int. Cl.
| | | |
|---|---|---|
| *H02P 21/02* | (2006.01) | |
| *F01P 11/12* | (2006.01) | |
| *F01P 11/02* | (2006.01) | |
| *G01K 7/42* | (2006.01) | |

(52) U.S. Cl.
CPC .............. *F01P 11/12* (2013.01); *F01P 11/02* (2013.01); *G01K 7/42* (2013.01)

(58) Field of Classification Search
CPC .................................. F01P 11/12; F01P 11/02
USPC ................................................... 318/400.02
See application file for complete search history.

(56) References Cited

U.S. PATENT DOCUMENTS

| | | | | |
|---|---|---|---|---|
| 2013/0249888 A1* | 9/2013 | Sugimoto | ............ | G09G 3/3233 345/212 |
| 2014/0125165 A1* | 5/2014 | Miyamoto | ............... | H02K 1/32 310/54 |
| 2015/0035391 A1* | 2/2015 | Fuchs | ...................... | H02K 9/19 310/53 |
| 2015/0042184 A1 | 2/2015 | Matsumoto | | |
| 2015/0048772 A1 | 2/2015 | Nagata et al. | | |
| 2015/0295531 A1* | 10/2015 | Kim | ...................... | G01K 13/08 318/400.22 |

(Continued)

FOREIGN PATENT DOCUMENTS

| | | |
|---|---|---|
| JP | 2010-28887 | 2/2010 |
| JP | 2015-033995 A | 2/2015 |
| KR | 10 2014 0146618 A | 12/2014 |

*Primary Examiner* — Erick Glass
(74) *Attorney, Agent, or Firm* — Finnegan, Henderson, Farabow, Garrett & Dunner, LLP

(57) ABSTRACT

An estimator includes a model unit that calculates a state quantity by using an input signal and a relational expression that expresses a target model, a correction signal measurement sensor that measures a correction signal for correcting the state quantity, a correction unit that outputs a value for correcting the state quantity based on the correction signal to the model unit, and a model changing unit that changes the model unit in accordance with an oil flow related value that relates to a change of flow of cooling oil. The correction signal measurement sensor is arranged to be in contact with a metal member that includes a coil conductive wire that constitutes the stator coil, a terminal connected to the coil conductive wire, and a power line connected between the coil conductive wire and the terminal, at a point on which no cooling oil drops.

4 Claims, 8 Drawing Sheets

(56) References Cited

U.S. PATENT DOCUMENTS

2016/0146450 A1* 5/2016 Benhamou .......... F21V 33/0008
                                                  362/555
2017/0054346 A1* 2/2017 Matsumoto .............. H02K 9/19
2017/0257054 A1* 9/2017 Tsumasaka ............ H02K 11/21

* cited by examiner

FIG. 7
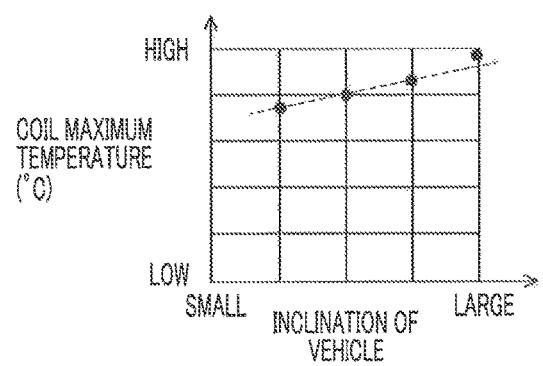
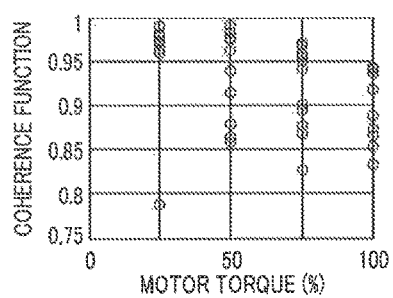
FIG. 8A
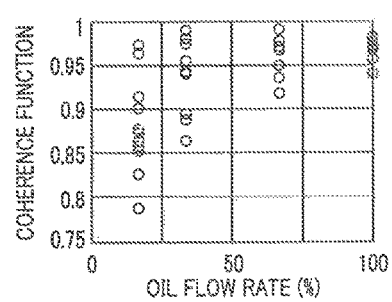
FIG. 8B

ESTIMATOR AND ESTIMATOR SYSTEM

INCORPORATION BY REFERENCE

The disclosure of Japanese Patent Application No. 2016-125848 filed on Jun. 24, 2016 including the specification, drawings and abstract is incorporated herein by reference in its entirety.

BACKGROUND OF THE INVENTION

1. Field of the Invention

The invention relates to an estimator and estimator system that estimate the temperature of a stator coil of an electric rotary machine that is cooled by cooling oil.

2. Description of Related Art

An electric rotary machine that is a motor or a generator includes a stator coil. In such an electric rotary machine, an excessive increase in the coil temperature of the stator coil may lead to a decrease in the performance of the electric rotary machine. Therefore, it is conceivable to cool the stator coil with the use of cooling oil. In addition, the coil temperature is measured by a temperature sensor. For example, in an electric vehicle or hybrid vehicle including a drive motor, a sensor is attached near a stator coil of the motor, and the coil temperature of the stator coil is measured by the sensor.

Japanese Patent Application Publication No. 2010-28887 (JP 2010-28887 A) describes the following configuration. By supplying cooling oil to a stator of an electric rotary machine through a selected one of a plurality of flow passages, the cooling oil is dropped in the central axis direction from substantially just above the electric rotary machine in the vertical direction of the electric rotary machine irrespective of an inclined state of a vehicle body on which the electric rotary machine is mounted.

SUMMARY OF THE INVENTION

With the configuration that the coil temperature is measured by the temperature sensor attached to the stator coil, if oil drops on the temperature sensor, the temperature sensor may measure a temperature close to the oil temperature. Thus, output from the temperature sensor varies depending on whether oil drops on the temperature sensor, so it may not be able to highly accurately estimate the coil temperature. For this reason, when coil current is controlled, it is required to protect the coil at a high factor of safety. Even when the coil temperature has reached a temperature significantly lower than a physically allowable upper limit temperature of the stator coil, motor output is decreased by decreasing the coil current because of the factor of safety. Thus, it may not be able to effectively exercise the output of the electric rotary machine.

On the other hand, in the configuration described in JP 2010-28887 A, it is conceivable to measure the coil temperature of the electric rotary machine with the use of the temperature sensor. In this case, the manner in which cooling oil drops on the temperature sensor may be constant irrespective of an inclination of the vehicle body on which the motor is mounted. However, with this configuration, a flow passage structure becomes considerably complicated.

The invention provides an estimator and estimator system that are able to highly accurately estimate the coil temperature of an electric rotary machine without a complicated flow passage structure of the electric rotary machine that is cooled by cooling oil.

A first aspect of the invention provides an estimator configured to estimate a temperature of a stator coil of an electric rotary machine. The electric rotary machine is cooled by cooling oil. The estimator includes an electronic control unit and a correction signal measurement sensor. The electronic control unit includes a model unit configured to calculate a state quantity by using an input signal and a relational expression that expresses a target model. The correction signal measurement sensor is configured to measure a correction signal for correcting the state quantity. The electronic control unit further includes a correction unit configured to output a value for correcting the state quantity on the basis of the correction signal to the model unit, and a model changing unit configured to change the model unit in accordance with an oil flow related value that relates to a change of flow of the cooling oil. The correction signal measurement sensor is arranged so as to be in contact with a metal member that includes a coil conductive wire that constitutes the stator coil, a terminal connected to the coil conductive wire, and a power line connected between the coil conductive wire and the terminal, at a point on which no cooling oil drops.

A second aspect of the invention provides an estimator system. The estimator system includes a plurality of estimators and selection means. The plurality of estimators each are configured to estimate a temperature of a stator coil of an electric rotary machine. The electric rotary machine is cooled by cooling oil. The plurality of estimators each include an electronic control unit and a correction signal measurement sensor. Each electronic control unit includes a model unit configured to calculate a state quantity by using an input signal and a relational expression that expresses a target model. The correction signal measurement sensor is configured to measure a correction signal for correcting the state quantity. Each electronic control unit further includes a correction unit configured to output a value for correcting the state quantity on the basis of the correction signal to the model unit, and a model changing unit configured to change the model unit in accordance with an oil flow related value that relates to a change of flow of the cooling oil. The correction signal measurement sensor is arranged so as to be in contact with a metal member that includes a coil conductive wire that constitutes the stator coil, a terminal connected to the coil conductive wire, and a power line connected between the coil conductive wire and the terminal, at a point on which no cooling oil drops. The selection means is configured to select a maximum temperature of the stator coil from among the temperatures of the stator coil, respectively estimated by the plurality of estimators.

With the estimator and estimator system according to the aspects of the invention, it is possible to highly accurately estimate the coil temperature without a complicated flow passage structure of the electric rotary machine that is cooled by cooling oil. As a result, it is not required to protect the stator coil at a high factor of safety. Therefore, for example, when the electric rotary machine is a motor, it is possible to generate the output of the motor up to a temperature close to an upper limit temperature that is physically allowed by the stator coil.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a graph that shows the results of an experiment in which the relationship between an inclination of the vehicle and a maximum temperature of the coils is obtained;

FIG. 8A shows the relationship between a coherence function and a motor torque and FIG. 8B shows the relationship between a coherence function and an oil flow rate where the coherence function indicates the correlation between a temperature at a position at which the temperature is maximum in the coils and a terminal temperature of a terminal block;

DETAILED DESCRIPTION OF EMBODIMENTS

Figure 1:
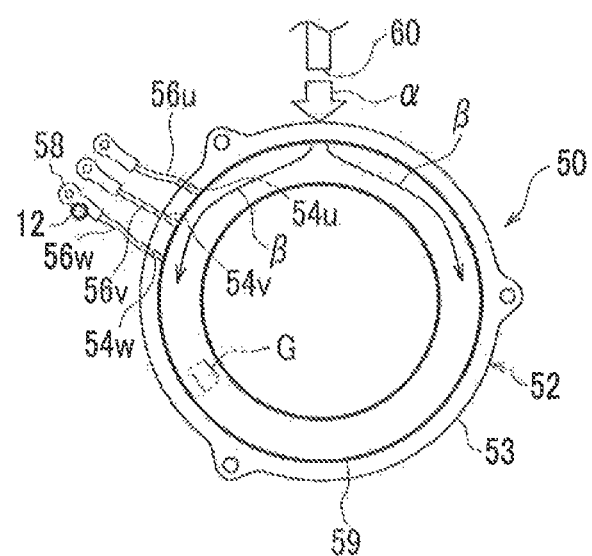
FIG. 1 is a view that shows a position at which a correction signal measurement sensor that constitutes an estimator is attached in a motor to which the estimator according to an embodiment of the invention is applied.

Hereinafter, an embodiment of the invention will be described with reference to the accompanying drawings. The shape, material and number that will be described below are used for illustrative purposes, and may be modified as needed in accordance with the specifications of an estimator and estimator system. When a plurality of embodiments, alternative embodiments, and the like, are provided in the following description, those may be combined as needed. In the following description, like reference numerals denote equivalent components in all the drawings. In the following description, reference numerals referred to before then are used where necessary. Hereinafter, description will be made on the assumption that an electric rotary machine is a motor; instead, the electric rotary machine may be a generator.

FIG. 1 is a view that shows a position at which a correction sensor 12 is attached in a motor 50. The motor 50 serves as an electric rotary machine to which an estimator 10 according to the embodiment is applied. The correction sensor 12 serves as a correction signal measurement sensor that constitutes the estimator 10. Initially, the motor 50 will be described. The motor 50 includes a stator 52 and a rotor (not shown). In the stator 52, three-phase stator coils 54u, 54v, 54w are wound on an annular stator core 53.

Part of each of the three-phase stator coils 54u, 54v, 54w is led to the outside from the stator core 53 and forms a corresponding one of three power lines 56u, 56v, 56w. Hereinafter, the power lines 56u, 56v, 56w are collectively referred to as power lines 56. The stator coils 54u, 54v, 54w are collectively referred to as coils 54. A terminal 58 is fixed to one end of each of the power lines 56 by crimping part of the terminal 58 such that the terminal 58 is in close contact with the corresponding power line 56. Thus, the thermal resistance between each power line 56 and the corresponding terminal 58 is sufficiently low. Each power line and the corresponding terminal may be fixed to each other by bringing each power line into close contact with the corresponding terminal in a sufficiently low thermal resistance state by means of welding or soldering. Each of the terminals 58 is fixed to a terminal block (not shown), and is connected to a corresponding one of three-phase electric wires (not shown) connected to a power supply-side inverter via the terminal block.

The rotor is arranged so as to face the radially inner side of the stator 52. The rotor is fixed to the radially outer side of a rotary shaft (not shown). The rotor includes magnets arranged at multiple positions in the circumferential direction of a rotor core. When the motor is an induction motor, a rotor coil is arranged on the rotor core. The motor 50 generates a magnetic field in the stator when the stator coils are energized, and rotates the rotor by magnetic interaction between the stator and the magnets of the rotor.

An annular coil end 59 is formed at the axial end of the stator. In the motor 50, as indicated by the arrow α in FIG. 1, cooling oil is dripped from a dropping portion 60. Thus, cooling oil is caused to flow along the surface of the coil end 59 as indicated by the arrow β in FIG. 1. The dropping portion 60 is arranged on the upper side of the axial end of the motor 50. Thus, the motor 50 is cooled. Cooling oil that has flowed along the surface of the coil end 59 is recovered from a lower-side oil reservoir (not shown), flows through an oil passage (not shown), and returns to the dropping portion 60.

The thus configured motor 50 is mounted on a vehicle, such as an electric vehicle and a hybrid vehicle, and is used. The hybrid vehicle includes an engine and a motor as drive sources for wheels. For example, the motor 50 is a drive motor. The wheels are driven by transmitting power from the drive motor to the wheels.

In the thus configured motor 50, as a comparative embodiment, it is conceivable that a sensor for estimating a coil temperature, indicated by the alternate long and short dashes line G in FIG. 1, is attached at a position near the coils different from the power lines. In the comparative embodiment, a detected signal of the sensor is transmitted to a controller, and the controller estimates the maximum temperature of the coils. In this comparative embodiment, oil can drop on the sensor, and the manner in which oil drops can vary depending on the inclination of the vehicle, the longitudinal acceleration of the vehicle, or the like. For example, the position at which the coil temperature indicates a maximum temperature in the coils can vary depending on the driving state of the motor 50 or the moving state of the vehicle. Thus, the accuracy of estimating an estimated temperature of the coils with the use of the sensor can deteriorate. On the other hand, it is conceivable that the sensor is attached at a position significantly remote from the coils around the stator core 53 such that no oil drops on the coils in order for drops of oil not to influence estimation of the coil temperature. At this time, the temperature is estimated at a position significantly remote from the coils, so the accuracy of estimating the coil temperature can deteriorate.

Figure 2:
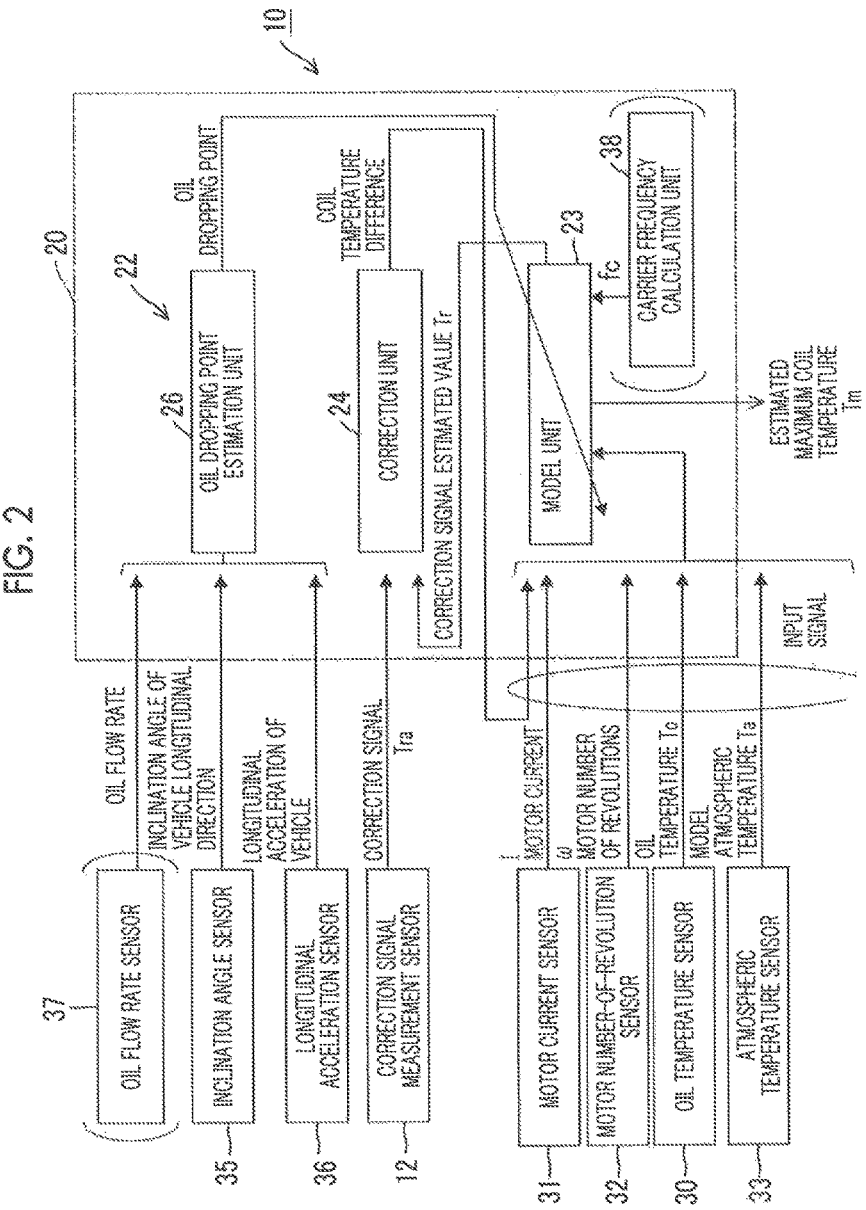
FIG. 2 is a block diagram that shows signal processing that is executed in the estimator according to the embodiment.
Figure 3:
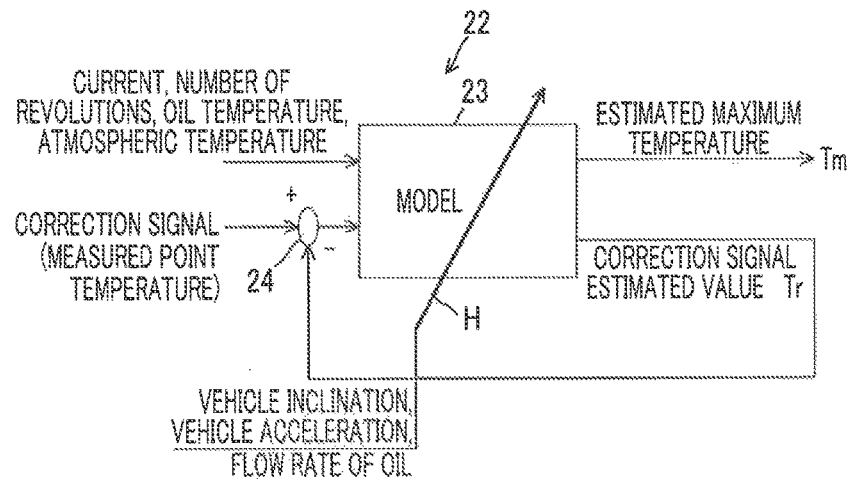
FIG. 3 is a conceptual view of an observer that constitutes the estimator according to the embodiment.

The estimator 10 according to the embodiment includes an observer 22 (FIG. 2, FIG. 3). The observer 22 has a relational expression that expresses a thermal resistance model of the coils 54 inside the observer 22, and estimates the coil temperature by calculation. At this time, the observer 22 constantly needs a correction signal for correcting an error, such as a modeling error and a sensor error. The correction signal cannot be utilized in the observer 22 if the correction signal does not correlate with the coil temperature. In order to obtain a signal having a high correlation, it is conceivable that the temperature of a portion near the coils is used as the correction signal; however, in that case, oil becomes easier to drop on the temperature sensor. The inventor researched the position that correlates with the coil temperature by actual measurement, including a position at which a thermal transmission path is different. As a result, it was found that the terminal and power line remote from the coils also have a high correlation in temperature with respect to the coils. Hereinafter, the case where a correction signal that expresses a temperature measured on a metal material that constitutes one of the terminals is used as the observer 22 according to the embodiment will be described. A correction signal that expresses the temperature of a position at which no oil drops on the power lines 56 may be used.

FIG. 2 is a block diagram that shows signal processing in the estimator 10. FIG. 3 is a conceptual view of the observer 22 that constitutes the estimator 10.

The estimator 10 estimates the coil temperature of the coils 54, for example, the maximum temperature of the coils 54. The estimator 10 includes a controller (electronic control unit) 20 and the correction sensor 12 (FIG. 1, FIG. 2). The correction sensor 12 serves as the correction signal measurement sensor. The controller 20 includes the observer 22. The observer 22 includes a model unit 23, a correction unit 24 and an oil dropping point estimation unit 26. The oil dropping point estimation unit 26 serves as a model changing unit. In FIG. 3, the model changing unit is indicated by the straight-line arrow H.

The model unit 23 calculates an estimated maximum coil temperature Tm and an estimated terminal temperature Tr as state quantities by using input signals and the relational expression that expresses a target model. The estimated maximum coil temperature Tm is an estimated value of the maximum temperature of the coils 54. The estimated terminal temperature Tr is an estimated value of the correction signal.

Figure 4:
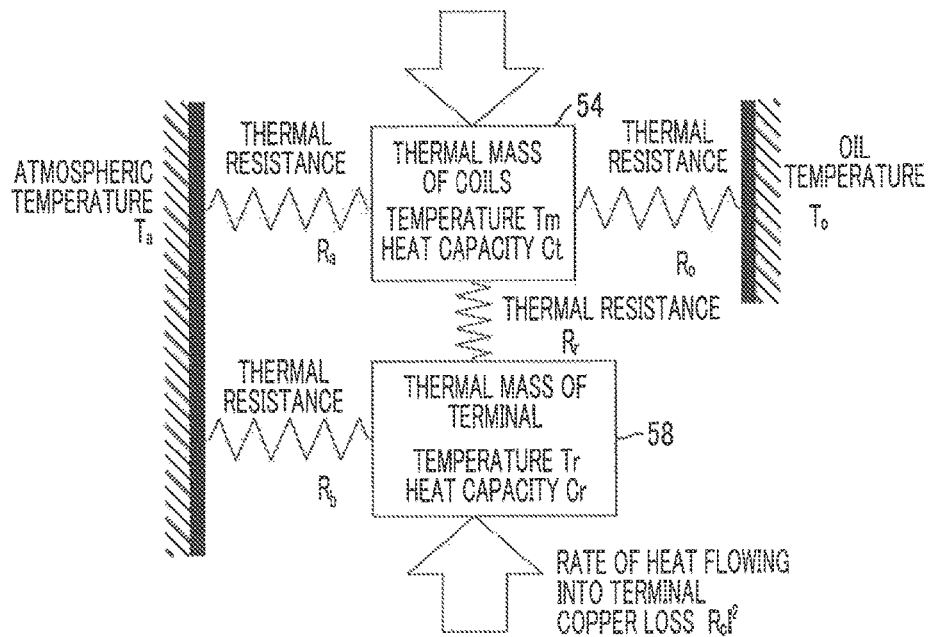
FIG. 4 is a view that shows a first example of a thermal resistance model of coils, which is used in the estimator according to the embodiment.

A specific example of the thermal resistance model that is the target model will be described with reference to FIG. 4. FIG. 4 is a view that shows one example of the thermal resistance model of the coils 54, which is used in the estimator 10. The thermal resistance model includes the coils 54 and the terminal 58 that are connected to each other via a thermal resistance Rr. The terminal 58 is a portion to be detected. The coils 54 have an estimated maximum coil temperature Tm. The terminal 58 has an estimated terminal temperature Tr as an estimated correction signal value. A portion that has an atmospheric temperature Ta is connected to the coils 54 via a thermal resistance Ra, and a portion that has an atmospheric temperature Ta is connected to the terminal 58 via a thermal resistance Rb. A cooling oil that has a temperature $T_o$ is connected to the coils 54 via a thermal resistance Ro. A copper loss $RI^2$ and an iron loss $K_eI^2\omega^2$ are input as the rate of heat flowing into the portion that generates the estimated maximum coil temperature Tm. A copper loss $R_cI^2$ is input as the rate of heat flowing into the terminal 58.

The thermal resistance model shown in FIG. 4 is expressed by the following relational expressions (1) and (2).

$$C_t \frac{dT_m}{dT} = RI^2 + k_e I^2 \omega^2 - R_a(T_m - T_a) - R_r(T_m - T_r) - R_o(T_m - T_o) \quad (1)$$

$$C_r \frac{dT_r}{dT} = R_c I^2 - R_b(T_r - T_a) - R_r(T_t - T_m) \quad (2)$$

In the mathematical expressions (1) and (2), Ct is the heat capacity of the coils 54, R is the electrical resistance of the coils 54, I is a motor current that is a current flowing through the coils, Ke is an iron loss coefficient that is an eddy current loss coefficient, and ω is the motor number of revolutions. Cr is the heat capacity of the terminal 58, and Rc is the electrical resistance of the terminal 58. In the mathematical expression (1), the iron loss may be estimated as $KhI^2\omega$ on the assumption that a hysteresis loss coefficient is denoted by Kh in the case where the material has a large hysteresis loss.

In the above thermal resistance model, as can be understood from the mathematical expression (1), a conductive wire that constitutes the coils 54 increases in temperature due to heat that is generated due to the copper loss $RI^2$ associated with motor current and the iron loss $K_eI^2\omega^2$ of the stator core 53 due to a variation in magnetic field. On the other hand, as can be understood from the mathematical expression (2), the terminal 58 increases in temperature almost not under the influence of a variation in magnetic field but under the significant influence of the copper loss $R_cI^2$.

As shown in FIG. 4, the temperature of the thermal mass of the coils 54 and the terminal 58 as the conductor increases due to heat generated in the conductive wire, and the like. On the other hand, the coils 54 are cooled by oil, and the heat of the coils 54 is drawn by oil. At the same time, heat also transfers into an engine room through the stator core 53, a motor case (not shown) to which the stator 52 is fixed, and the like. For this reason, the atmospheric temperature Ta increases. Heat is also exchanged via the conductors, and the like, between the thermal mass of the coils 54 and the thermal mass of the terminal 58. The temperature of each thermal mass is determined as a result of heat generation and heat exchange at this time.

In the mathematical expressions (1) and (2), the motor current I, the motor number of revolutions ω, an oil temperature To and the atmospheric temperature Ta are input as input signals, and the estimated maximum coil temperature Tm and the estimated terminal temperature Tr are calculated.

Referring back to FIG. 2, one or a plurality of signals selected from among the oil temperature To of cooling oil, the motor current I, the motor number of revolutions ω, a carrier frequency fc that is used to control the motor 50, and the model atmospheric temperature Ta are input to the model unit 23 as input signals. For example, in the case of the thermal resistance model shown in FIG. 4, the oil temperature To, the motor current I, the motor number of revolutions ω and the model atmospheric temperature Ta are input to the model unit 23 as input signals.

Specifically, the estimator 10 includes an oil temperature sensor 30, a motor current sensor 31, a motor number-of-revolution sensor 32 and an atmospheric temperature sensor 33. The oil temperature sensor 30 is cooling oil temperature detecting means. The oil temperature sensor 30 detects the temperature of cooling oil. The motor current sensor 31 detects the amount of current that is input to the coils. The motor number-of-revolution sensor 32 detects the number of revolutions of the rotor per unit time. The atmospheric temperature sensor 33 detects the model atmospheric temperature Ta that is the atmospheric temperature of the target model. Detected signals of the oil temperature sensor 30, motor current sensor 31, motor number-of-revolution sensor 32 and atmospheric temperature sensor 33 are input to the model unit 23. The motor number-of-revolution sensor 32 may be replaced with a motor rotational speed sensor that detects the rotational speed of the rotor.

The correction sensor 12 is a temperature sensor that measures a terminal temperature Tra indicated by a correction signal. The correction sensor 12 is arranged so as to be in contact with a metal member that constitutes the terminals 58 (FIG. 1) connected to the coil conductive wires that constitute the coils 54, at a point on which no cooling oil drops. The correction sensor 12 outputs a correction signal to the correction unit 24.

The correction unit 24 corrects the state quantities on the basis of the correction signal that indicates the terminal temperature Tra. The state quantities are the estimated maximum coil temperature Tm that is an estimated value of the maximum temperature of the coils 54 and the estimated terminal temperature Tr that is an estimated value of the correction signal.

The correction sensor 12 is not limited to the case where the correction sensor 12 is arranged on the terminals 58. For example, the correction sensor 12 may be arranged so as to be in contact with a metal member that constitutes the coil conductive wires, at a point on which no cooling oil drops. At this time, part of the coil conductive wires may constitute the corresponding power lines.

When power lines are respectively connected as other members between the coil conductive wires and the terminals 58, the correction sensor 12 may be arranged so as to be in contact with a metal member that constitutes the power lines, at a point on which no cooling oil drops.

The model unit 23 outputs the estimated maximum coil temperature Tm and the estimated terminal temperature Tr. Of these, the estimated terminal temperature Tr is input to the correction unit 24. The terminal temperature Tra indicated by the correction signal is also input to the correction unit 24, and a coil temperature difference that is calculated in correspondence with a difference between the terminal temperature Tra and the estimated terminal temperature Tr is input to the model unit 23. The difference is used to correct the state quantities. The model unit 23, as well as the common observer 22, corrects the estimated maximum coil temperature Tm and the estimated terminal temperature Tr by using a gain corresponding to the coil temperature difference. Thus, the correction unit 24 corrects the estimated maximum coil temperature Tm and the estimated terminal temperature Tra as the state quantities by outputting a value corresponding to the difference between the terminal temperature Tra and the estimated terminal temperature Tr to the model unit 23 through the correction signal.

The estimator 10 includes the oil dropping point estimation unit 26 as the model changing unit. Hereinafter, the oil dropping point estimation unit 26 is referred to as oil point estimation unit 26. The oil point estimation unit 26 changes the model unit 23 in accordance with an oil flow related value related to a change of flow of cooling oil. For example, the oil point estimation unit 26 changes the model unit 23 in accordance with one or two or more of the inclination of the vehicle with respect to the longitudinal direction of the vehicle, the longitudinal acceleration that is the longitudinal acceleration of the vehicle and the flow rate of cooling oil as the oil flow related values.

In FIG. 2, the estimator 10 includes an inclination angle sensor 35 and a longitudinal acceleration sensor 36. The inclination angle sensor 35 detects the inclination angle of the vehicle with respect to the longitudinal direction of the vehicle. The longitudinal acceleration sensor 36 detects the longitudinal acceleration of the vehicle. Detected signals of the inclination angle sensor 35 and longitudinal acceleration sensor 36 are input to the oil point estimation unit 26. The oil point estimation unit 26 changes the model unit 23 in accordance with a combination of the inclination of the vehicle and the acceleration of the vehicle based on the detected signals of the inclination angle sensor 35 and longitudinal acceleration sensor 36. Specifically, the oil point estimation unit 26 estimates the oil dropping point on the basis of a combination of the inclination of the vehicle and the acceleration of the vehicle. The oil point estimation unit 26 changes the coefficient of the relational expression that expresses the model unit 23, for example, the thermal resistance Ro, by using a predetermined relationship or map on the basis of the estimated dropping point. Thus, the model unit 23 is changed.

Figure 5:
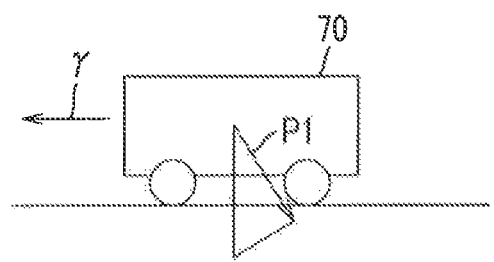
FIG. 5 is a schematic view that shows the influence of a longitudinal acceleration of a vehicle on flow of oil that cools the motor.
Figure 6:
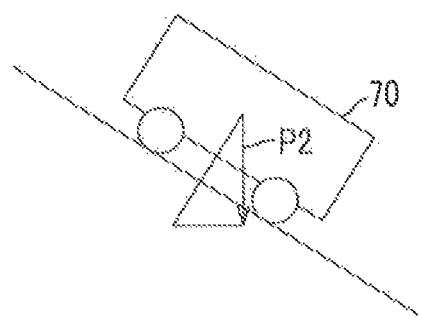
FIG. 6 is a schematic view that shows the influence of an inclination angle with respect to a longitudinal direction of the vehicle on flow of oil.

FIG. 5 is a schematic view that shows the influence of the longitudinal acceleration of a vehicle 70 on flow of oil that cools the motor. FIG. 6 is a schematic view that shows the influence of the inclination angle of the vehicle with respect to the longitudinal direction of the vehicle on flow of oil. In FIG. 5, the direction in which oil dropped from the dropping portion 60 (FIG. 1) flows at the time when the vehicle accelerates in the forward traveling direction (the arrow γ direction in FIG. 5) is schematically indicated by the arrow P1. As is apparent from FIG. 5, oil flows obliquely rearward at the time of forward acceleration. Thus, the oil dropping point changes. As shown in FIG. 6, when the vehicle 70 is inclined as in the case where the vehicle 70 is placed on a hill, oil flows obliquely rearward of the vehicle 70 (arrow P2 direction). Thus, the oil dropping point also changes.

FIG. 7 is a graph that shows the results of experiment in which the relationship between the inclination of the vehicle and the maximum temperature of the coils is obtained. In FIG. 7, the motor current, the motor number of revolutions, the oil flow rate and the oil temperature are constant. As shown in FIG. 7, when the vehicle inclines in a state where oil drops from above the motor 50, the maximum temperature of the coils varies with a variation in the inclination angle, so it is understood that there is a high correlation between the inclination angle and the maximum temperature.

On the basis of the relationships described with reference to FIG. 5 to FIG. 7, the oil point estimation unit 26 estimates the oil dropping point by using a combination of the inclination of the vehicle and the acceleration of the vehicle, and changes the model unit 23 in accordance with the estimated point.

In FIG. 2, the oil point estimation unit 26 is used as the model changing unit; however, another configuration may be employed. For example, the estimator 10 may include an oil flow rate sensor 37 (FIG. 2) that detects the oil flow rate, and the model unit 23 may be changed on the basis of a detected signal of the oil flow rate sensor 37. The model changing unit may be configured to change the model unit 23 on the basis of a combination of the inclination of the vehicle, the acceleration of the vehicle and the oil flow rate of cooling oil.

With the above-described estimator 10, it is possible to highly accurately estimate the coil temperature. As a result, it is not required to protect the coils 54 at a high factor of safety. Therefore, for example, it is possible to generate the output of the motor 50 up to a temperature close to an upper limit temperature that is physically allowed by the coils 54. With the estimator 10, different from the configuration described in JP 2010-28887 A, the flow passage structure of the motor 50 that is cooled by oil is not complicated.

The reason why the estimator 10 is able to highly accurately estimate the coil temperature is based on the position of the correction sensor 12 that is the temperature sensor and a change of the model. First, as for the position of the correction sensor 12, when the temperature sensor is arranged near the coils, different from the embodiment, there is a high possibility that oil drops on the temperature sensor. If oil drops on the temperature sensor, a detected temperature of the temperature sensor is a value closer to the temperature of oil than to the coil temperature, so it is difficult to accurately estimate the coil temperature.

On the other hand, when the correction sensor 12 that is the temperature sensor as described above is arranged so as to be in contact with a metal that constitutes the terminals 58 arranged at a point on which no oil drops and remote from the coils 54, it is understood that the correlation between the temperature of the coils 54 and the terminal temperature is high. Thus, the observer 22 is able to highly accurately estimate the coil temperature by using the temperature of the terminals 58 on which no oil drops.

FIG. 8A is a graph that shows the relationship between a coherence function and a motor torque. The coherence function expresses the correlation between the temperature of a point at which the temperature is maximum in the coils and the terminal temperature of the terminal block. FIG. 8B is a graph that shows the relationship between a coherence function and an oil flow rate for the terminal temperature.

The coherence function is obtained by dividing the square of the absolute value of cross-spectrum by the power spectrum of each of measured input and the output of the system. The cross-spectrum is averaged by multiplying predetermined frequency components of spectra of signals of the coil temperature and terminal temperature with each other. A high coherence function indicates that the correlation between the coil temperature and the terminal temperature is high.

From the results shown in FIG. 8A and FIG. 8B, when the motor torque and the oil flow rate are used as parameters as well, the coherence function is high and is substantially higher than or equal to 0.8 irrespective of variations in motor torque and oil flow rate. Thus, it has been verified that the terminal temperature is usable for the observer 22.

As for a change of the model, in a cooling manner of dropping oil to the coils, the degree of cooling of the coils significantly depends on the flow state of oil. The biggest factor that dominates the flow state of oil is the inclination of the motor with respect to the longitudinal direction of the motor due to pitch movement of the vehicle. In the embodiment, the model unit is changed by using the inclination of the vehicle as a parameter, so it is possible to improve the accuracy of estimating the coil temperature.

Figure 9:
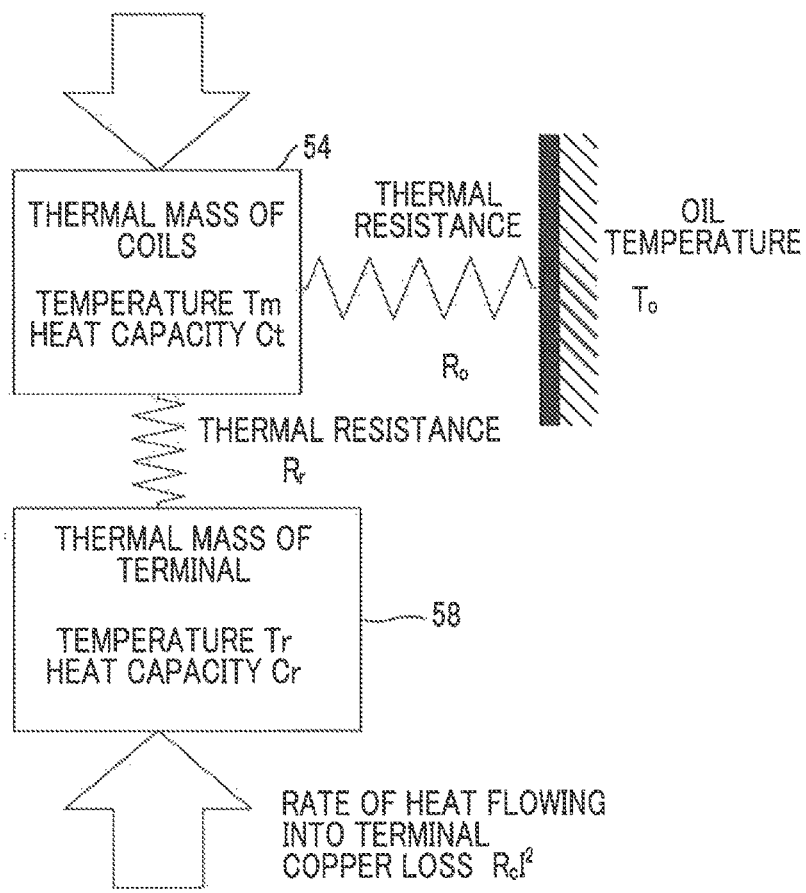
FIG. 9 is a view that shows another example of a thermal resistance model of the coils, which is used in the estimator according to the embodiment.

FIG. 9 is a view that shows another example of the thermal resistance model of the coils, which is used in the estimator 10 according to the embodiment. In another example shown in FIG. 9, the heat transfer path from a portion that has the atmospheric temperature to the terminal 58 is omitted from the model shown in FIG. 4. The model shown in FIG. 9 is effectively applicable to the case where transfer of heat into the engine room through the stator core 53 (FIG. 1), the motor case, and the like, is small. For this reason, the relational expressions that express the model shown in FIG. 9 are obtained by omitting the terms including the atmospheric temperature Ta and the thermal resistances Ra, Rb from the mathematical expressions (1) and (2). In FIG. 2, the atmospheric temperature sensor 33 is omitted. The remaining configuration and operation are similar to the configuration shown in FIG. 1 to FIG. 4.

Figure 10:
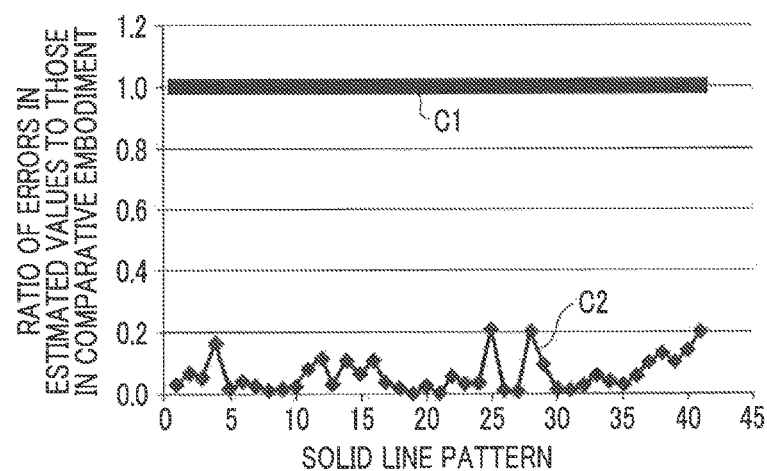
FIG. 10 is a graph that shows the results of experiment in which the ratio of errors in estimated values of coil temperature in the estimator according to the embodiment to errors in estimated values of coil temperature in a temperature estimator according to a comparative embodiment is obtained where the errors in the estimated values of coil temperature in the temperature estimator according to the comparative embodiment is 1.
Figure 11A:
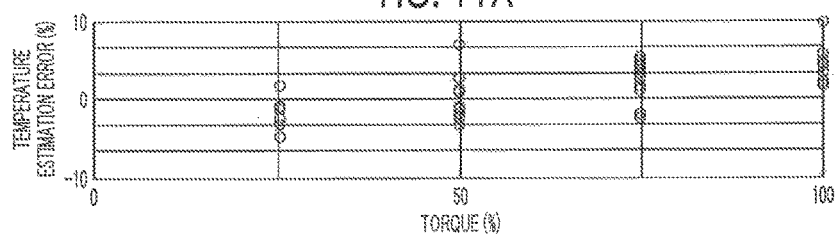
FIG. 11A shows the results of experiment in which the relationship between an error in estimating a coil temperature and a motor torque in the estimator according to the embodiment is obtained.
Figure 11B:
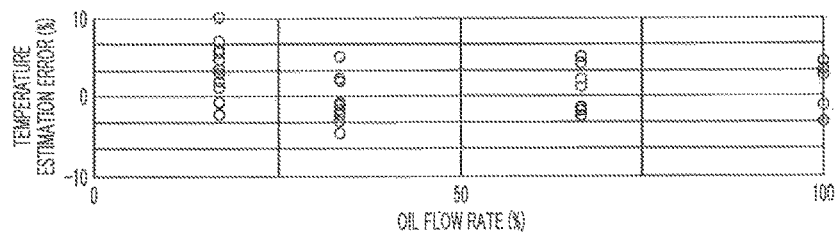
FIG. 11B shows the results of experiment in which the relationship between an error in estimating a coil temperature and an oil flow rate in the estimator according to the embodiment is obtained.

FIG. 10, FIG. 11A and FIG. 11B show the results of checking the accuracy of estimating the coil temperature according to the embodiment. FIG. 10 is a graph that shows the results of experiment in which the ratio of errors in estimated values of coil temperature in the estimator according to the embodiment to errors in estimated values of coil temperature in a temperature estimator according to a comparative embodiment is obtained where the errors in the estimated values of coil temperature in the temperature estimator according to the comparative embodiment is 1. The abscissa axis of FIG. 10 represents the reference numbers of a plurality of experimental patterns. In the comparative embodiment, the temperature sensor is arranged at a position indicated by the alternate long and two short dashes line G in FIG. 1, and the coil temperature is estimated from the temperature detected by the temperature sensor. In the embodiment, the configuration shown in FIG. 1 to FIG. 3 is used. In FIG. 10, the wide line C1 indicates the comparative embodiment, and the narrow line C2 indicates the embodiment. As is apparent from the results shown in FIG. 10, errors in estimating the coil temperature were significantly reduced in the embodiment as compared to the comparative embodiment.

FIG. 11A is a graph that shows the results of experiment in which the relationship between an error in estimating a coil temperature and a motor torque is obtained in the estimator 10 according to the embodiment. FIG. 11B is a graph that shows the results of experiment in which the relationship between an error in estimating a coil temperature and an oil flow rate is obtained. As is apparent from the results shown in FIG. 11A and FIG. 11B, in the embodiment, even when the motor torque or the oil flow rate varies, it is possible to reduce an error in estimating the coil temperature.

Figure 12:
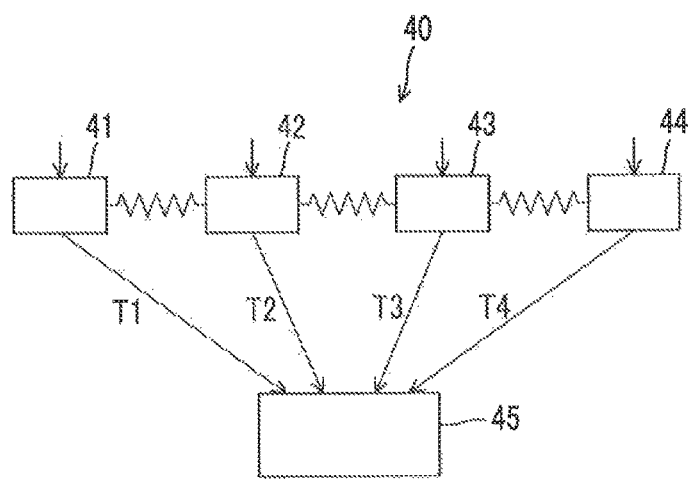
FIG. 12 is a view that shows the configuration of an estimator system according to an embodiment of the invention.
Figure 13:
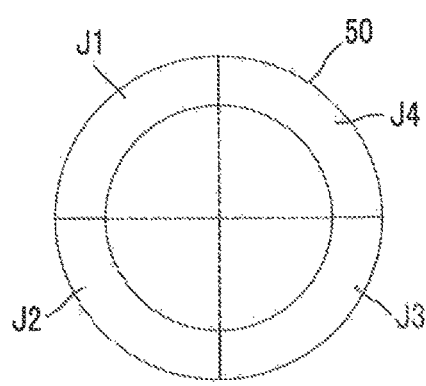
FIG. 13 is a view that shows a plurality of ranges in which a plurality of estimators that constitute the estimator system are respectively arranged in a motor.

FIG. 12 is a view that shows the configuration of an estimator system 40 according to an embodiment. FIG. 13 is a view that shows a plurality of ranges in which a plurality of estimators 41, 42, 43, 44 that constitute the estimator system 40 are respectively arranged in the motor 50.

The estimator system 40 includes the four estimators 41, 42, 43, 44 and selection means 45. The configuration of each of the four estimators 41, 42, 43, 44 is similar to the estimator 10 shown in FIG. 1 to FIG. 3. As shown in FIG. 13, the stator coils of the motor 50 are allowed to be divided into a plurality of thermal masses by the ranges J1, J2, J3, J4 each having the same length in the circumferential direction. The plurality of estimators 41, 42, 43, 44 respectively estimate maximum temperatures T1, T2, T3, T4 of the plurality of thermal masses. Specifically, the four estimators 41, 42, 43, 44 respectively estimate the maximum temperatures of the four thermal masses J1, J2, J3, J4 of the coils. Each of the estimators 41, 42, 43, 44 may have a different thermal model. The estimated maximum temperatures T1, T2, T3, T4 are input to the selection means 45.

The selection means 45 selects the maximum temperature of the coils from among the estimated maximum temperatures T1, T2, T3, T4 of the coils, respectively estimated by the four estimators 41, 42, 43, 44. Thus, the motor 50 serves as a model that expresses the distribution of heat, and the distribution of heat in the coils is allowed to be obtained. At this time, in the mathematical expressions (1) and (2), the heat capacity Ct of the coils, the estimated maximum coil temperature Tm, and the thermal resistances Rr, Ra form a matrix.

With the thus configured estimator system 40, it is possible to acquire the distribution of the temperature of the coils by increasing the state quantities of the model unit 23, so control that takes into consideration a local increase in temperature is possible. Thus, it is possible to reduce the degradation of the motor 50 due to heat.

In the above-described mathematical expression (1), an iron loss that takes into consideration a carrier frequency fc that is used in control over the motor may be included. The loss in this case is obtained by employing $neIc^2fc^2$ as an eddy current loss with the use of a current ripple amount Ic due to a carrier, a proportionality constant ne and a carrier frequency fc instead of $KeI^2\omega^2$ in the mathematical expression (1) or by employing $nhIc^2fc$ as a hysteresis loss with the use of a proportionality constant nh. At this time, the carrier frequency fc calculated by a carrier frequency calculation unit 38 (FIG. 2) may be used as an input signal that is used in the observer 22. Therefore, an input signal that is used in the estimator 10 may be a signal that indicates one or a plurality of the oil temperature To, the motor current I, the motor number of revolutions $\omega$, the carrier frequency fc and the atmospheric temperature Ta.

The invention may be defined as follows. An estimator configured to estimate a temperature of a stator coil of an electric rotary machine, the electric rotary machine configured to be cooled by cooling oil, the estimator includes: an electronic control unit configured to calculate a state quantity by using an input signal and a relational expression that expresses a target model; and a correction signal measurement sensor configured to measure a correction signal for correcting the state quantity, the electronic control unit being configured to output a value for correcting the state quantity based on the correction signal, and change the relational expression that expresses the target model in accordance with an oil flow related value that relates to a change of flow of the cooling oil, the correction signal measurement sensor being arranged such that the correction signal measurement sensor is in contact with a metal member that includes a coil conductive wire that constitutes the stator coil, a terminal connected to the coil conductive wire, and a power line connected between the coil conductive wire and the terminal, at a point on which no cooling oil drops. An estimator system comprising: a plurality of estimators each configured to estimate a temperature of a stator coil of an electric rotary machine, the electric rotary machine configured to be cooled by cooling oil, the plurality of estimators each including an electronic control unit configured to calculate a state quantity by using an input signal and a relational expression that expresses a target model, and a correction signal measurement sensor configured to measure a correction signal for correcting the state quantity, each electronic control unit being configured to output a value for correcting the state quantity based on the correction signal, and change the relational expression that expresses the target model in accordance with an oil flow related value that relates to a change of flow of the cooling oil, the correction signal measurement sensor being arranged such that the correction signal measurement sensor is in contact with a metal member that includes a coil conductive wire that constitutes the stator coil, a terminal connected to the coil conductive wire, and a power line connected between the coil conductive wire and the terminal, at a point on which no cooling oil drops; and selection means configured to select a maximum temperature of the stator coil from among the temperatures of the stator coil, respectively estimated by the plurality of estimators.

What is claimed is:

1. An estimator configured to estimate a temperature of a stator coil of an electric rotary machine, the electric rotary machine configured to be cooled by cooling oil, the estimator comprising:
   an electronic control unit configured to calculate a state quantity by using an input signal and a relational expression that expresses a target model; and
   a correction signal measurement sensor configured to measure a correction signal for correcting the state quantity,
   the electronic control unit being configured to
   output a value for correcting the state quantity based on the correction signal, and
   change the relational expression that expresses the target model in accordance with an oil flow related value that relates to a change of flow of the cooling oil,
   the correction signal measurement sensor being arranged such that the correction signal measurement sensor is in contact with a metal member that includes a coil conductive wire that constitutes the stator coil, a terminal connected to the coil conductive wire, and a power line connected between the coil conductive wire and the terminal, at a point on which no cooling oil drops.

2. The estimator according to claim 1, wherein
   the correction signal measurement sensor is arranged on the terminal that serves as the metal member, and
   the electronic control unit is configured to change the relational expression that expresses the target model in accordance with at least one of an inclination of a vehicle on which the electric rotary machine is mounted, an acceleration of the vehicle and a flow rate of the cooling oil, as the oil flow related value.

3. The estimator according to claim 1, wherein
   the input signal is a signal that indicates one or a plurality of a temperature of the cooling oil, a current flowing through the electric rotary machine, the number of revolutions of the electric rotary machine, a carrier frequency that is used in control over the electric rotary machine, and an atmospheric temperature of the target model.

4. An estimator system comprising:
   a plurality of estimators each configured to estimate a temperature of a stator coil of an electric rotary machine, the electric rotary machine configured to be cooled by cooling oil,
   the plurality of estimators each including an electronic control unit configured to calculate a state quantity by using an input signal and a relational expression that expresses a target model, and a correction signal measurement sensor configured to measure a correction signal for correcting the state quantity, each electronic control unit being configured to output a value for correcting the state quantity based on the correction signal, and change the relational expression that expresses the target model in accordance with an oil flow related value that relates to a change of flow of the cooling oil, the correction signal measurement sensor being arranged such that the correction signal measurement sensor is in contact with a metal member that includes a coil conductive wire that constitutes the stator coil, a terminal connected to the coil conductive wire, and a power line connected between the coil conductive wire and the terminal, at a point on which no cooling oil drops; and selection means configured to select a maximum temperature of the stator coil from among the temperatures of the stator coil, respectively estimated by the plurality of estimators.

* * * * *